(12) United States Patent
Gorny

(10) Patent No.: US 11,223,318 B2
(45) Date of Patent: Jan. 11, 2022

(54) INTEGRATED EXTERNAL CONNECTORS

(71) Applicant: SunPower Corporation, San Jose, CA (US)

(72) Inventor: Lee J. Gorny, Mountain View, CA (US)

(73) Assignee: SunPower Corporation, San Jose, CA (US)

( * ) Notice: Subject to any disclaimer, the term of this patent is extended or adjusted under 35 U.S.C. 154(b) by 75 days.

(21) Appl. No.: 16/370,649

(22) Filed: Mar. 29, 2019

(65) Prior Publication Data

US 2019/0305715 A1 Oct. 3, 2019

Related U.S. Application Data

(60) Provisional application No. 62/651,031, filed on Mar. 30, 2018.

(51) Int. Cl.
| | | |
|---|---|---|
| *H02S 20/00* | (2014.01) | |
| *F16B 5/06* | (2006.01) | |
| *B65D 71/00* | (2006.01) | |
| *B65D 85/48* | (2006.01) | |

(52) U.S. Cl.
CPC ............. *H02S 20/00* (2013.01); *B65D 71/00* (2013.01); *B65D 85/48* (2013.01); *F16B 5/0607* (2013.01); *F16B 2005/0678* (2013.01)

(58) Field of Classification Search
CPC ......... H02S 20/00; B65D 71/00; B65D 85/48; F16B 5/0607; F16B 2005/0678
See application file for complete search history.

(56) References Cited

U.S. PATENT DOCUMENTS

| | | | | |
|---|---|---|---|---|
| 5,048,999 A | * | 9/1991 | Wurl | F16B 2/14 |
| | | | | 403/374.2 |
| 6,381,915 B1 | * | 5/2002 | Wood | E04F 19/02 |
| | | | | 248/617 |
| 8,407,895 B2 | * | 4/2013 | Hartelius | F24S 25/40 |
| | | | | 29/890.033 |
| 9,416,992 B2 | * | 8/2016 | Braunstein | H02S 20/23 |
| 9,531,319 B2 | | 12/2016 | Braunstein | |
| 9,777,948 B2 | | 10/2017 | Braunstein | |
| 9,813,015 B1 | | 11/2017 | Kapla | |

(Continued)

FOREIGN PATENT DOCUMENTS

| | | |
|---|---|---|
| WO | WO2012147532 A1 | 11/2012 |
| WO | WO2015121607 A2 | 8/2015 |

OTHER PUBLICATIONS

International Search Report and Written Opinion, PCT Application PCT/US2019/025017, dated Jul. 12, 2019.

*Primary Examiner* — Anita M King
(74) *Attorney, Agent, or Firm* — Grasso PLLC

(57) ABSTRACT

Connectors, systems with connectors and processes with connectors are described. These include how connectors can actively hold external portions of two frames or other components together during transport and before final installation, as well as, how the connectors can be repositionable on the frame or other component so as to provide a mechanical connection in one position and not to provide a mechanical connection when moved into a second position. The connectors can also function to provide spacing or alignment or both between frames or other components grouped together using the connectors.

21 Claims, 12 Drawing Sheets

(56) References Cited

U.S. PATENT DOCUMENTS

| | | |
|---|---|---|
| 10,177,704 B2 | 1/2019 | Kapla |
| 2011/0078892 A1 | 4/2011 | Hartelius |
| 2011/0220598 A1 | 9/2011 | Flossman |
| 2014/0367305 A1 | 12/2014 | Mizuo et al. |
| 2018/0054157 A1 | 2/2018 | Kapla |
| 2018/0062559 A1 | 3/2018 | Kapla |
| 2018/0091091 A1 | 3/2018 | Rossi |
| 2019/0372507 A1* | 12/2019 | Kobayashi .............. F16B 5/065 |

* cited by examiner

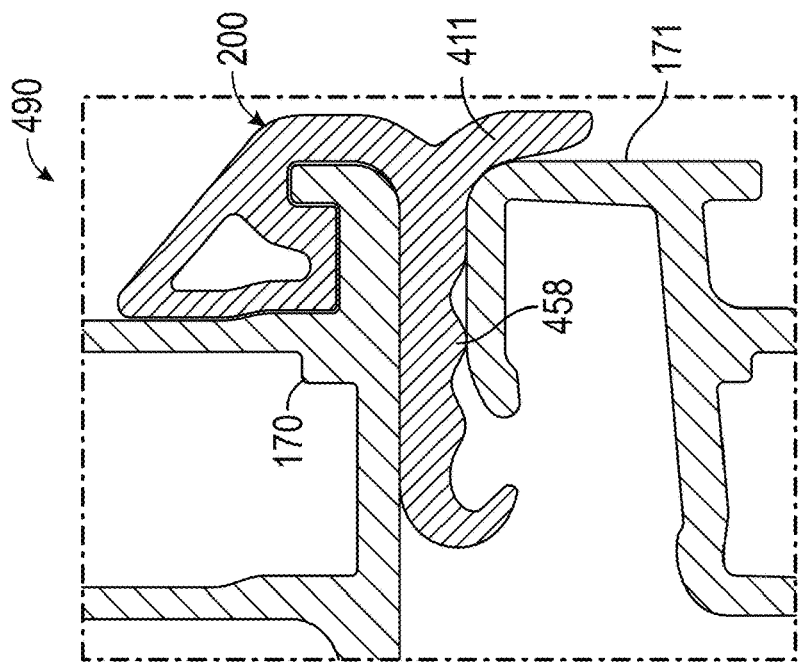
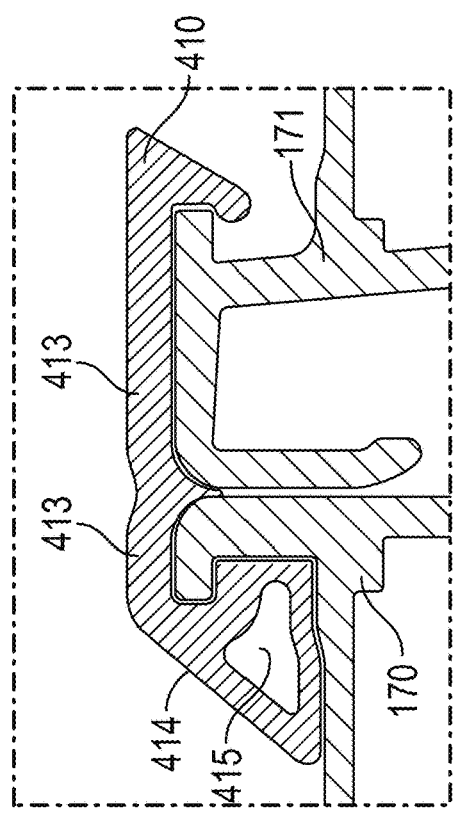
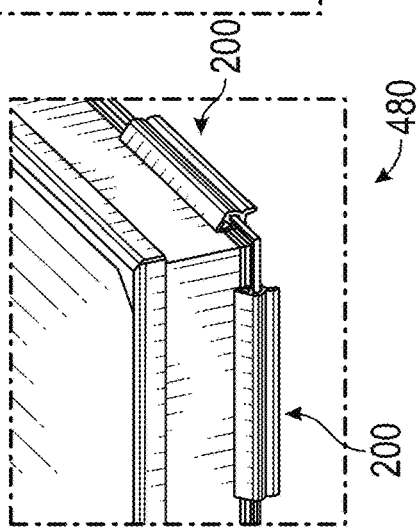
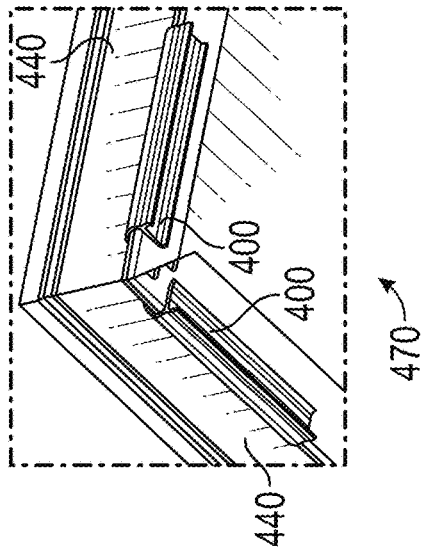
FIG. 4A
FIG. 4B
FIG. 4C
FIG. 4D

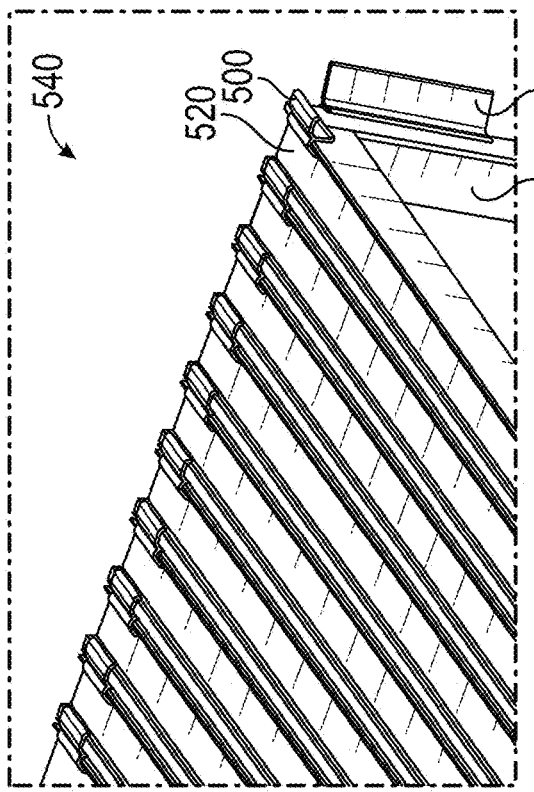
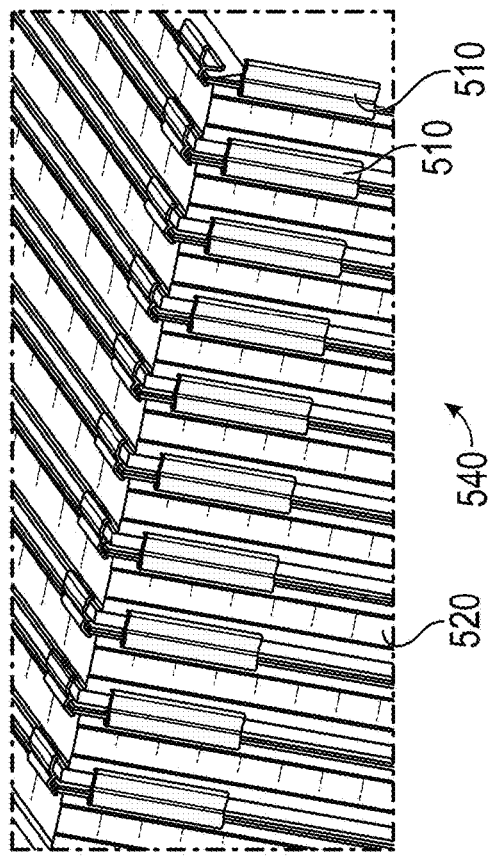
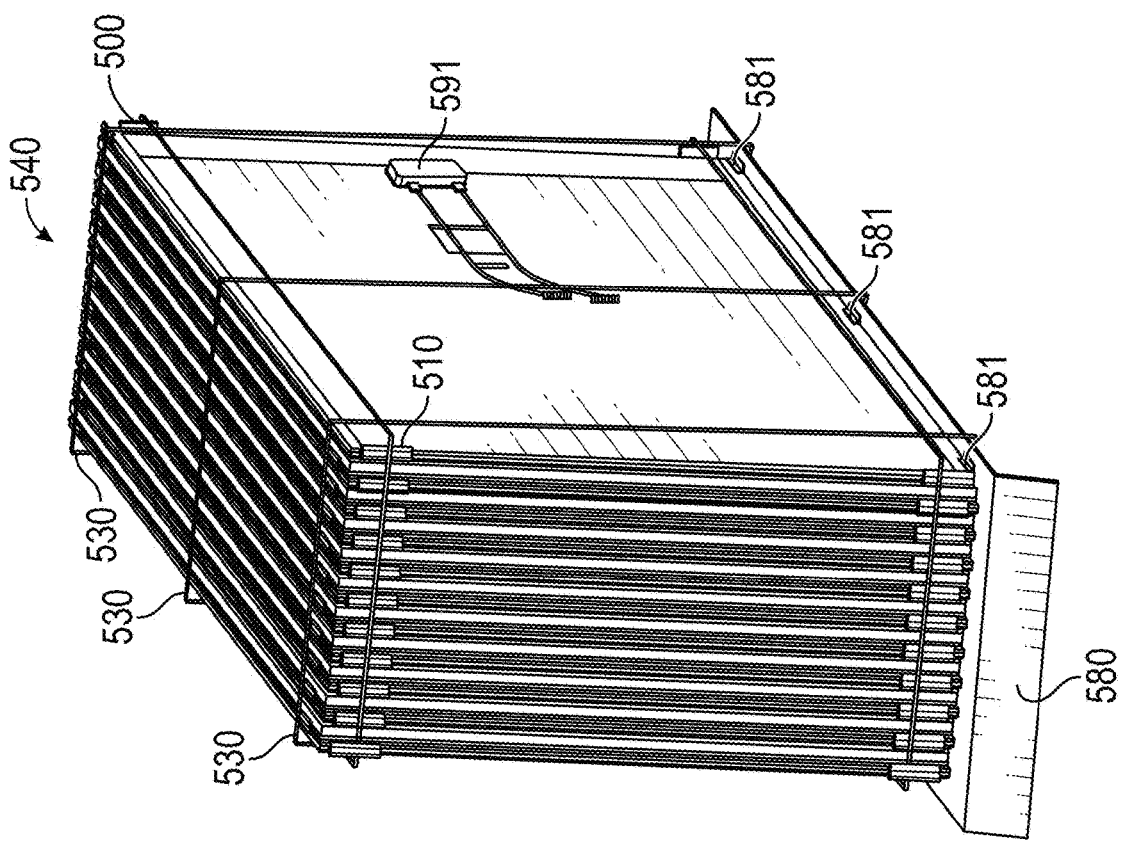
FIG. 5B
FIG. 5C
FIG. 5A

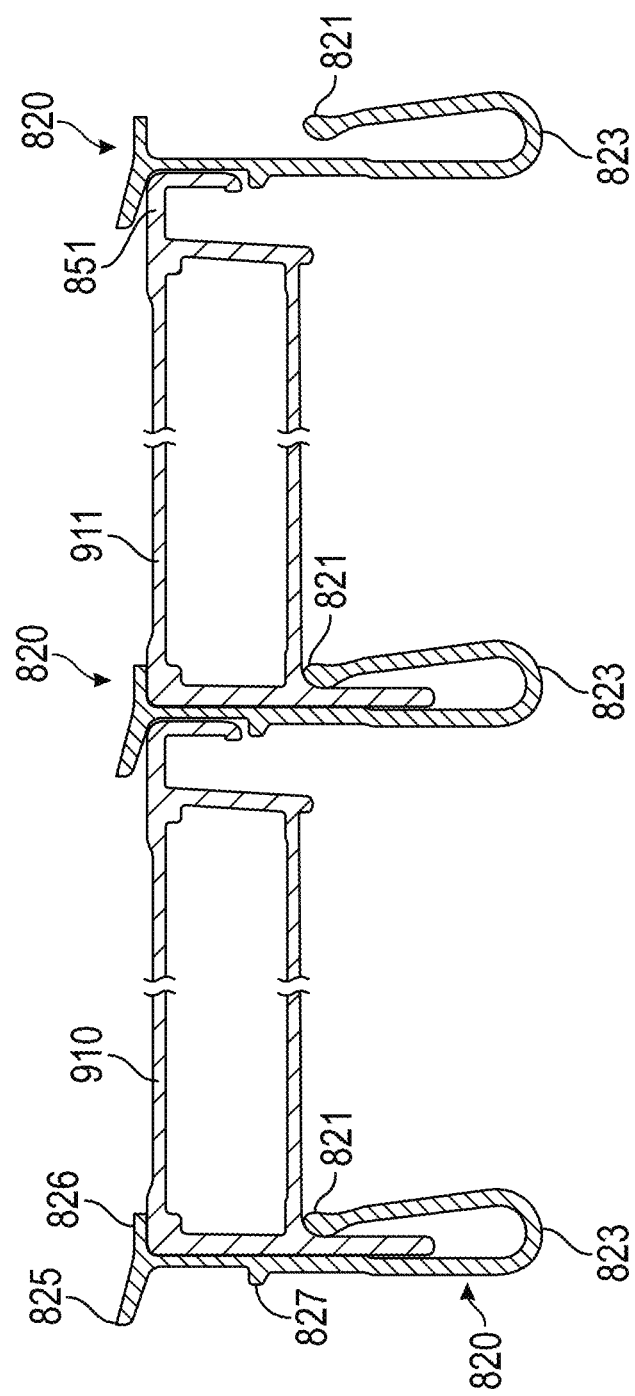

INTEGRATED EXTERNAL CONNECTORS

RELATED APPLICATION

This application claims priority to provisional application 62/651,031, which was filed on Mar. 30, 2018 and is entitled Integrated External Connectors. The '031 application is incorporated herein in its entirety by reference.

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

BRIEF DESCRIPTION OF THE DRAWINGS

FIGS. 4A-4D illustrate cross-sectional and schematic views of external frames and IECs as can be employed, according to some embodiments.

FIGS. 5A-5C illustrate full and close-up schematic views of vertically stacked PV panels with active and passive IECs as can be employed, according to some embodiments.

FIG. 9 illustrates side cross-sectional views of IECs engaging with roof panels of a modular roof as can be employed, according to some embodiments.

DETAILED DESCRIPTION

Figure 1A:
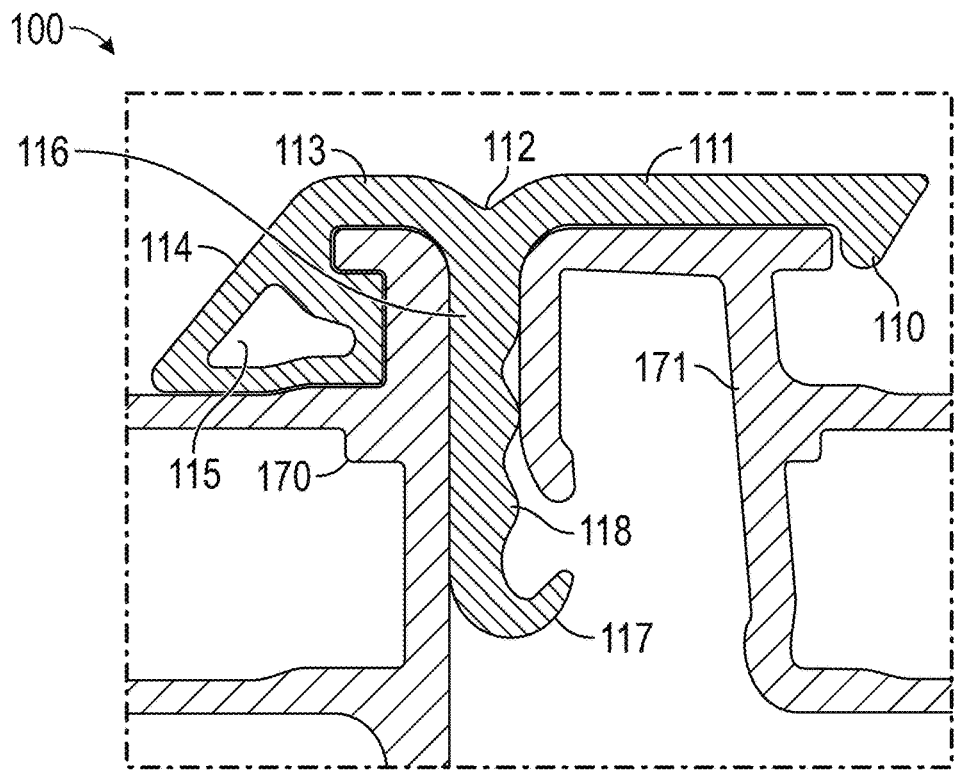
FIGS. 1A-1B illustrate cross-sectional views of integrated external connectors (IECs) as can be employed, according to some embodiments.

The following detailed description is merely illustrative in nature and is not intended to limit the embodiments of the application and uses of such embodiments. As used herein, the word "exemplary" means "serving as an example, instance, or illustration." Any implementation described herein as exemplary is not necessarily preferred or advantageous over other implementations. Furthermore, there is no intention to be bound by any expressed or implied theory presented in the preceding technical field, background, brief summary or the following detailed description.

References to "one embodiment" or "an embodiment" do not necessarily refer to the same embodiment. Particular features, structures, or characteristics can be combined in any suitable manner consistent with this disclosure.

Terminology

The following paragraphs provide definitions and/or context for terms found in this disclosure (including the appended claims):

"About" or "approximately". As used herein, the terms "about" or "approximately" in reference to a recited numeric value, including for example, whole numbers, fractions, and/or percentages, generally indicates that the recited numeric value encompasses a range of numerical values (e.g., +/−5% to 10% of the recited value) that one of ordinary skill in the art would consider equivalent to the recited value (e.g., performing substantially the same function, acting in substantially the same way, and/or having substantially the same result).

"Comprising" is an open-ended term that does not foreclose additional structure or steps.

"Configured to" connotes structure by indicating a device, such as a unit or a component, includes structure that performs a task or tasks during operation, as such, structure is configured to perform the task even when the device is not currently operational (e.g., is not on/active). A device "configured to" perform one or more tasks is expressly intended to not invoke 35 U.S.C. § 112, (f) or sixth paragraph.

"First," "second," etc. terms are used as labels for nouns that they precede, and do not imply any type of ordering (e.g., spatial, temporal, logical, etc.). For example, reference to a "first" IEC does not necessarily imply that this IEC is the IEC in a sequence; instead the term "first" is used to differentiate this IEC from another IEC (e.g., a "second" IEC).

"Based On." As used herein, this term is used to describe one or more factors that affect a determination. This term does not foreclose additional factors that can affect a determination. That is, a determination can be solely based on those factors or based, at least in part, on those factors. Consider the phrase "determine A based on B." While B can be a factor that affects the determination of A, such a phrase does not foreclose the determination of A from also being based on C. In other instances, A can be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit" describes a reducing, lessening, minimizing, or effectively or actually eliminating something, such as completely preventing a result, outcome or future state completely.

In addition, certain terminology can also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology can include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure can be practiced without these specific details. In other instances, well-known techniques are not described in detail in order to not unnecessarily obscure embodiments of the present disclosure.

PV laminates are often framed with an external metallic bordering frame (which can be referred to herein as PV frame). Together, the laminate and the frame can be referred to as a PV module. This bordering frame commonly surrounds the glass holding the PV cells. Other components can be secured to the PV frame, and the PV module can be secured to a support structure at the final installation site. During transport, the PV modules can be grouped vertically or horizontally on a pallet. Straps can be used to hold the group onto the pallet during transportation and prior to installation at a job site.

Various integrated external connectors (IECs), their use, and manufacture are provided herein. These IECs or other connectors can partially or fully mate with external portions of a frame or other component and can be moveable such that in a first position they serve as a connector or spacer or both between two components; and in a second position they are retracted or positioned such that they do not obstruct the use of one or both of the components that the IECs or other connectors were connecting. The IECs or other connectors can be comprised of various materials including flexible polymers, rigid polymers, metals, ceramics, and combinations thereof. Some configurations of the IECs or other connectors can provide for active securement, spacing and alignment between two components being connected by the IEC; while other configurations of the IECs, e.g., passive, can provide spacing and alignment but can require additional straps or other connectors to secure the components being connected together. In some embodiments, combinations of active and passive IECs can be employed to secure components together. The IECs can include hollow and solid portions. The IECs or other connectors can be configured to secure various portion of frames or other IECs or other connectors and can be positioned on outer surfaces of the frames, inner surfaces of the frames, on different surfaces of other connectors, and combinations thereof. Hollow portions of IECs can provide flexibility and relatively more deformation and recovery, while solid portions of IECs can provide relatively more rigidity and relatively less deformation. Other features of IECs can be deformable anchors, hinges, compression bumps, flanges, and securement arms. As referred to herein, integrated external connectors (IECs) can also be referred to as external connectors and/or can be referred to as connectors.

Embodiments can include connectors, such as clips or other IECs, wherein the connectors can be integrated onto a frame of a PV or other component being connected by the connector. The frames to which the connectors are secured can include a groove, channel, or other receptacle that can be used by the connector for purposes of gripping the frame and for securing frames together. This groove(s), channel, or other receptacle in the component can also serve other purposes, including being used for mounting the frame to a support structure and for attaching auxiliary components, such as microinverters when the frame is part of a PV module. Specific features of the grooves, channel, or other receptacles can be used by the IECs or other connectors. And, the IECs or other connectors can be employed for spacing purposes, for packaging purposes, to successfully join panels in either horizontal or vertical packaging, to reduce the amount of waste material on a job site, e.g., reduced banding and pallets, for corner protection, for glass protection, and for other reasons as well.

Embodiments can provide improvement for PV module packaging by reducing the time taken to gather and dispose of excess materials used in vertical shipment of PV modules to job sites. The IECs or other connectors of embodiments can be moveable, can be removable, or both, so they are less likely to interfere with PV frame mounting systems. Embodiments can also provide for air circulation between panels during frame to laminate (Room Temperature Vulcanization—RTV) adhesive manufacture process or for other purposes as well. During this manufacturing process, through the IEC or other connector design, panels can be staggered in a stack wherein air can pass between the panels allowing moisture in the air to move between panels and catalyze adhesive hardening. In so doing, IECs or other connectors can provide for the stagger of curing panels whereby less space can be needed for this curing. Also, embodiments can enable PV panels to be stagger stacked in a horizontal orientation—the IECs or other connectors can be robust enough to enable stacking of 20-60, or more, panels at a curing site, during this portion of the manufacturing process. Other numbers of panels can also be stacked or otherwise coupled, for example, 3, 5, 8, 10, 12, 15, 18, 35, etc. panels can be stacked or connected together using IECs or other connectors.

Embodiments can include an IEC or other connector with clip-on "stacking feature" that serves to couple PV modules together. Thus, embodiments can provide advantages during transportation and can protect panel surfaces. As noted above, embodiments can also provide an air gap between panels that are vertically stacked but not necessarily staggered to allow for airflow between panels in curing. Embodiments can also provide for rainwater management in carport and other leakproof panel designs. As also noted above, embodiments can also provide for both horizontal and vertical packaging of connected PV panels or other connected components.

Embodiments can comprise various polymers or other materials. The polymers can be extruded or molded and can include PP (polypropylene) as well as other extrudable and/or moldable polymers. Embodiments can also use any other polymer or metal material or combination thereof. In embodiments, these materials can be suitable for outdoor use, (e.g., can comprise UL F1 rated polymers) and can also comprise Polyethylene (PE), the NORYL family of modified resins, Polycarbonate (PC), Polyethylene terephthalate (PET), Polybutylene terephthalate (PBT), NYLON, and polyvinylidene difluoride (PVDF), among others. The IECs or other connectors can have variable sizes and can be readily truncated in the field or at the point of assembly to account for different connection demands. For example, heavier PV panels can require longer IECs or other connectors, which are uncut; but lighter PV panels can use a single IEC or other connector that has been cut in half and spaced further apart because of the lighter weight loading. To facilitate such truncation, an IEC or other connector can have multiple scores along its length and/or width and these scores can serve as separation lines so that the IEC or other connector can be made shorter or thinner in the field in order to accommodate a smaller panel or for another purpose.

As noted, the IECs or other connectors can be slidable or otherwise moveable in their installed location. This movability can be guided along a groove, channel, or other recess of a PV panel frame or other component being connected. This slidability can also allow the IECs or other connectors to be used in positions on the frame not available when the frame is in a final installed position on a support structure. In other words, an IEC or other connector can be positioned near a corner of a PV module frame where this corner is also used to secure the PV module to a support rail because the IEC or other connector can be slid or otherwise moved out of the way after transportation and before installation.

The IEC or other connector can be installed by a part supplier before final assembly of the PV frame or other component to be connected. Whether slidable or movable, the IECs or other connectors can also be configured to be wholly removed from the PV module when not needed. Conversely, IECs or other connectors can be slidable or otherwise optionally moveable in some embodiments and can remain with the PV module or other component after installation. The IECs or other connectors can also be configured to run an entire length of a side of a component to be connected. For example, for rain guttering of a carport or other roof or structure, a full-length extruded material can be formed for spacing in rainwater management, as shown in FIG. 9. The IEC or other connectors can also be shortened, as mentioned above, to accommodate field changes of the carport or other structure, and for other reasons as well. In embodiments, an IEC or other connector can also be used as a reference point and can be used for other procedures of manufacture or installation. For example, if frame engagement is tight, IECs or other connectors can be strategically placed to provide a reference point for certain types of module mounting.

Figure 1B:
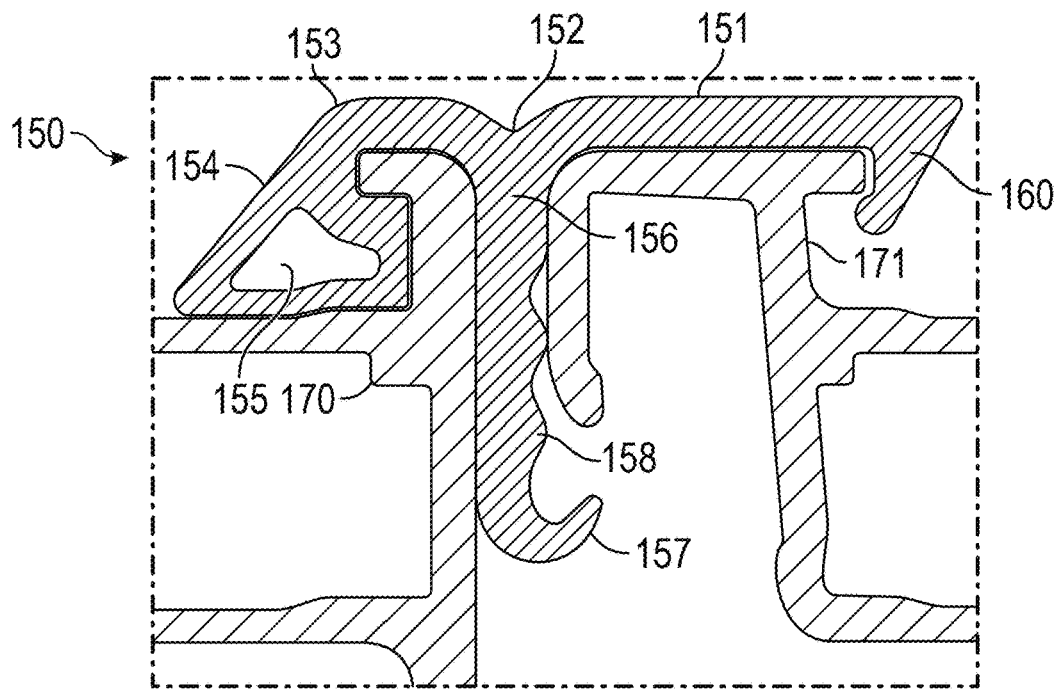

FIGS. 1A-1B illustrate cross-sectional views of integrated external connectors (IECs) 100, 150 as can be employed, according to some embodiments. The IECs of FIGS. 1A-1B, as well as in other embodiments, can be an extruded polymer component, or a component form of other suitable material, that can provide PV module constraining in horizontal packaging and module coupling in vertical packaging. In embodiments, the IECs can be installed on a PV frame during manufacturing or production of the frames and can remain the PV panel once it is installed at a location where panels are not typically mounted to support structures. In certain instances, where mounting can interfere with the location of an IEC, an IEC can either be slid out of the way or pulled off. The IEC can also be used to align panels on mounting systems.

In an embodiment, the IEC 100 of FIG. 1A and the IEC 150 of FIG. 1B as well as in other figures, are shown with two arms 111, 113, 151, and 153, and a hinge 112, 152 between them, a hook 117, 157 extends from a perpendicular tail 116, 156 in each of the IECs, and a deformable anchor 114, 154 comprising an optional hollow 115, 155 extends from one of the arms. The tails 116, 156 extend down and away from the hinges 112, 152, and the tails 116, 156 include a plurality of compression bumps 118, 158 and a hook 117, 157. In embodiments, one or more of the arms or the tail can have a short flange 110, or a long bulbous end flange 160 extending from it instead of, or in addition to, a hook 157, 117. Other configurations of the deformable anchors 114, 154, the hinges, 112, 152, the hooks, 117, 157, the arms, 111, 113, 151, and 153, and the other features of the IECs or other connectors can also be possible in embodiments. For example, the deformable anchors can be solid or can contain a more compressible material than the material comprising the majority of the extruded IEC.

When a short flange 110, as shown in FIG. 1A, is used in conjunction with an arm 111, 113, the IEC can be considered to be a passive IEC 100; and when a long hooked bulbous end flange 160, as shown in FIG. 1B, is used in conjunction with an arm 151, 153, the IEC can be considered an active IEC 150. In alternative embodiments, an IEC can comprise an arm that can lack a flange; such an IEC or other connector would also be considered a passive IEC. The manner in which an IEC or other connector can connect different style edges of adjacent components is shown in FIGS. 1A-1B. As can be seen, the IEC is configured to use rails 170, 171 of adjacent frames, even though these rails have different configurations. FIGS. 1A and 1B portray IECs 100, 150 connecting PV frames in vertical orientations.

Figure 2:
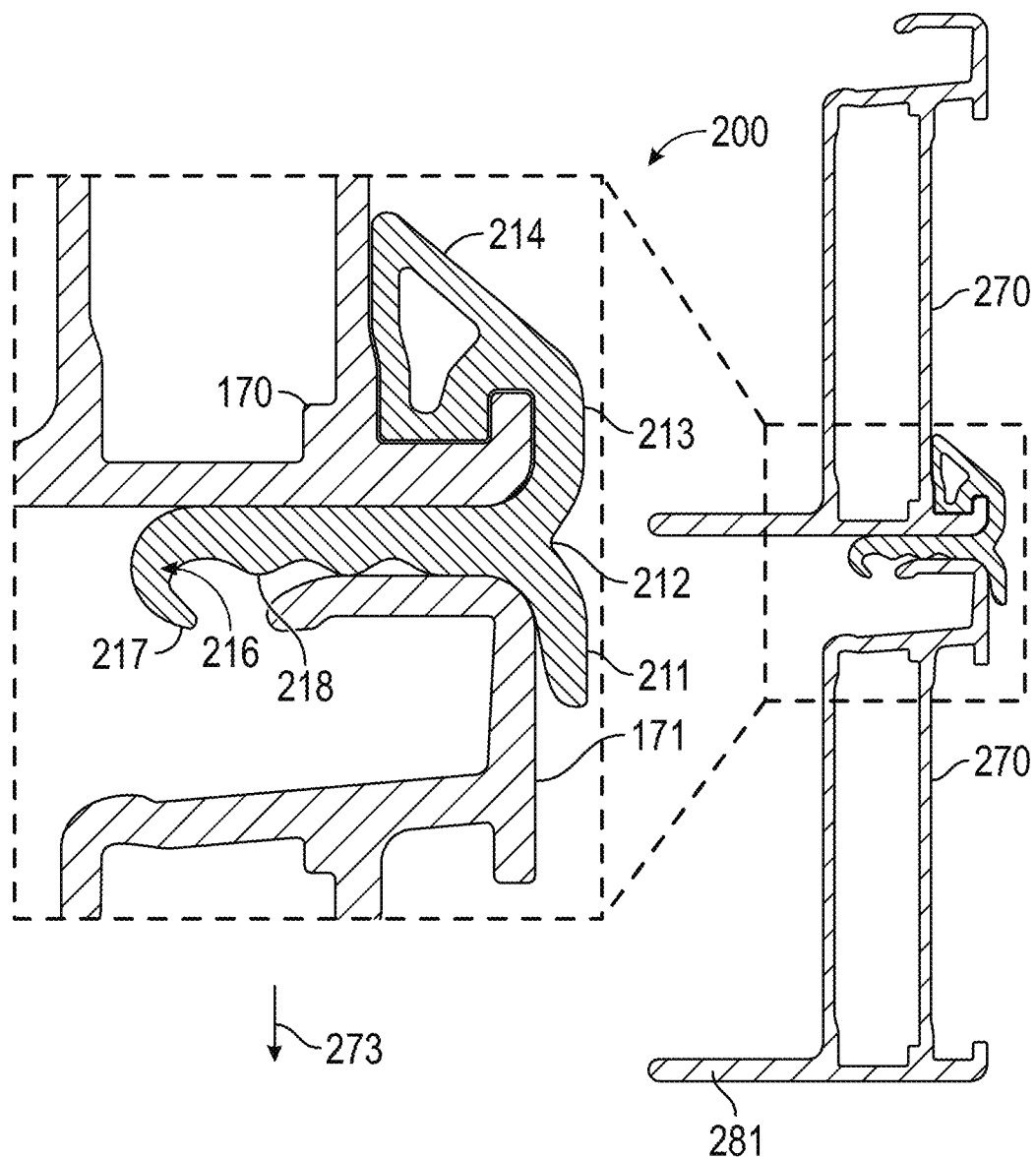
FIG. 2 illustrates a cross-sectional view of a passive IEC connecting horizontally stacked PV frames as can be employed, according to some embodiments.

FIG. 2 illustrates a cross-sectional view of a passive connector or IEC 200 connecting horizontally stacked PV frames as can be employed, according to some embodiments. The connector or IEC 200 in FIG. 2 has two arms 211, 213 like the IECs in FIG. 1. However, one of the arms 211 does not extend completely to the end of the lower rail frame 171. This short positioning, as well as the absence of a bulbous end flange, indicates that additional coupling will likely be present to hold the vertical PV panels or other components together. The IEC in this embodiment can serve to maintain spacing between adjacent connected components. Also labelled in FIG. 2 are compression bumps 218, tail 216, hook 217, upper frame rail 170, deformable anchor 214, hinge 212, PV frames 270, downward direction arrow 273, and PV frame flange 281.

Figure 3:
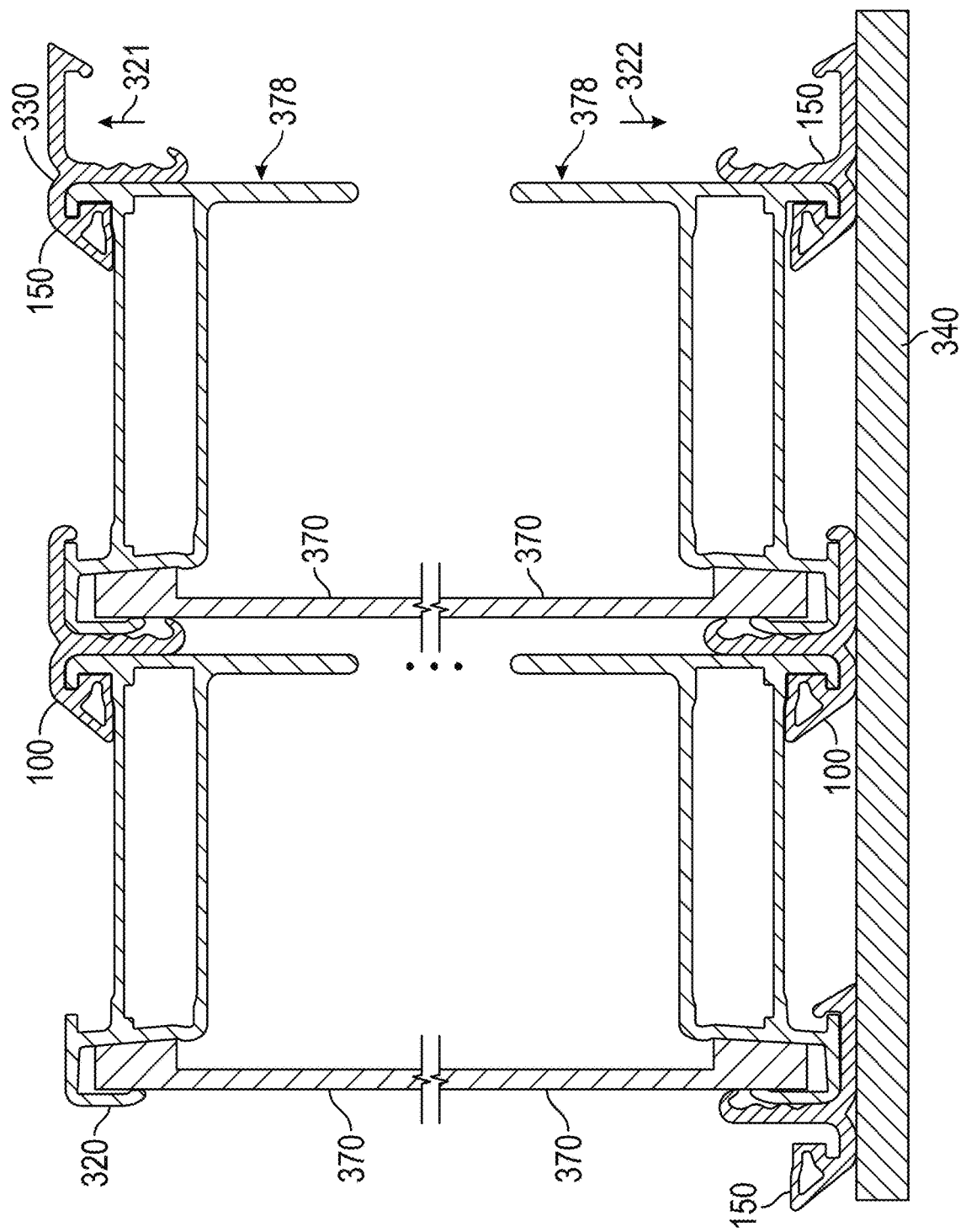
FIG. 3 illustrates a cross-sectional view of vertically oriented PV frames connected by active IECs and passive IECs as can be employed, according to some embodiments.

FIG. 3 illustrates a cross-sectional view of vertically oriented PV frames 370 connected by active IECs 150 and passive IECs 100, as can be employed, according to some embodiments. FIG. 3 shows how some IECs when being employed may not be engaged with two PV panels and can, instead, have an arm exposed and being unused. This exposed, unused arm can be ready to accept and connect with another PV panel or other component being connected. Also labelled in FIG. 3 are the PV panel 370, frame corner 320, pallet 340, IEC hinge 330, PV frame flanges 378, upward direction arrow 321, and downward direction arrow 322. The IEC upward and downward arrows 321, 322 show how an active IEC can be moved from one corner of a frame to another frame.

FIGS. 4A-4D illustrate cross-sectional and schematic views of PV external frames and IECs as can be employed, according to some embodiments. The IEC of FIG. 4A has a reduced length tail and lacks the hook and compression bumps of the IECs of FIGS. 1-3. FIGS. 4B and 4C at 400 and 200 show how IECs, such as clips or other connectors, can be positioned along many places of a PV panel frame 440 or other component being connected, and that the IECs can remain with or be removed from the PV panels. A short arm 411, which is on the left of the IEC in FIG. 4D, can serve to limit movement during transit. Also labelled in FIG. 4A are bulbous end flange 410, deformable anchor 414, optional hollow 415, PV frame rail 170, PV frame rail 171, arms 413, and compression bump 458. Frame sections 440 are shown in FIG. 4B along with joined frame sections 470. Joined frame sections 480 are shown in FIG. 4C and joined frame sections are shown at 490 of FIG. 4D.

FIG. 5 illustrates full (FIG. 5A) and close-up schematic views (FIGS. 5B, 5C) of a stack 540 of vertically stacked PV panels with active IECs 510 and passive IECs 500 as can be employed, according to some embodiments. Straps 530 are shown in FIG. 5A. These straps can be employed in embodiments that employ active IECs as well as passive IECs. As is shown in FIG. 5A, passive IECs can be positioned in one corner while active IECs can be positioned in a different corner. The straps can be anchored to a pallet 580 at anchor points 581. Circuitry for the PV panels is shown at 591 and PV frame sides are shown at 520.

In embodiments IECs can be placed on flanges of the PV modules in addition to or instead of the frame channels shown above. An exemplary PV frame flange is shown at 281 of FIG. 2. Push to release buttons can also be employed in embodiments. These push to release buttons can employ a mechanical catch that engages when press fit and can be released by depressing a button of some sort in order to disengage the connected parts.

Figure 6B:
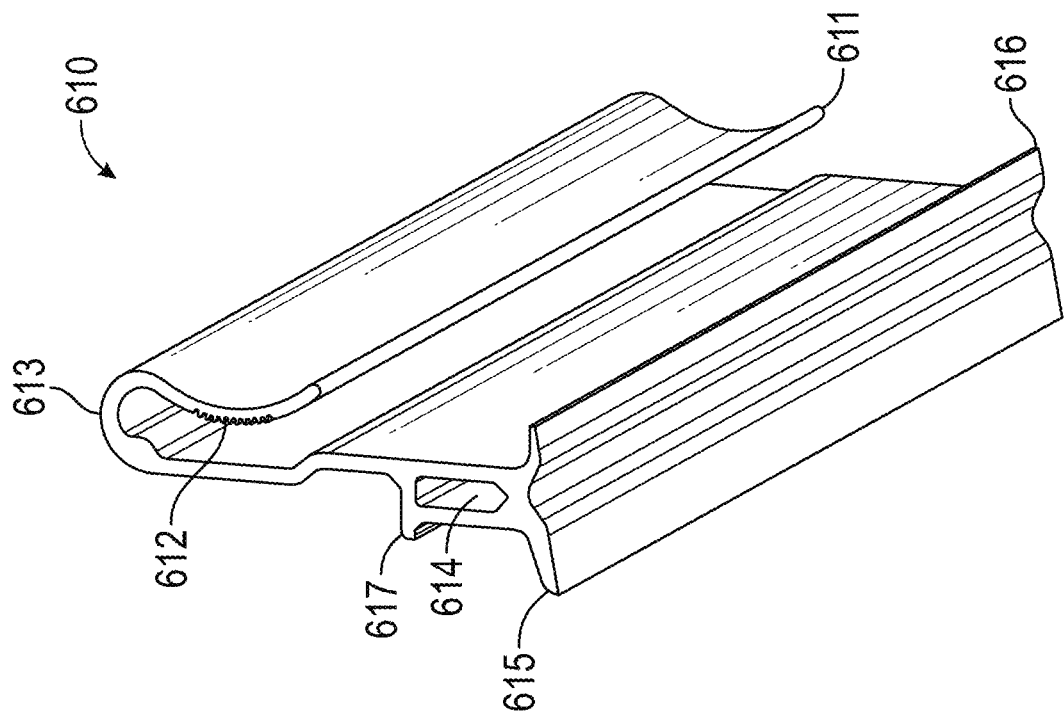
FIGS. 6A-6B illustrate a cross-sectional and perspective view of an IEC as can be employed, according to some embodiments.
Figure 6A:
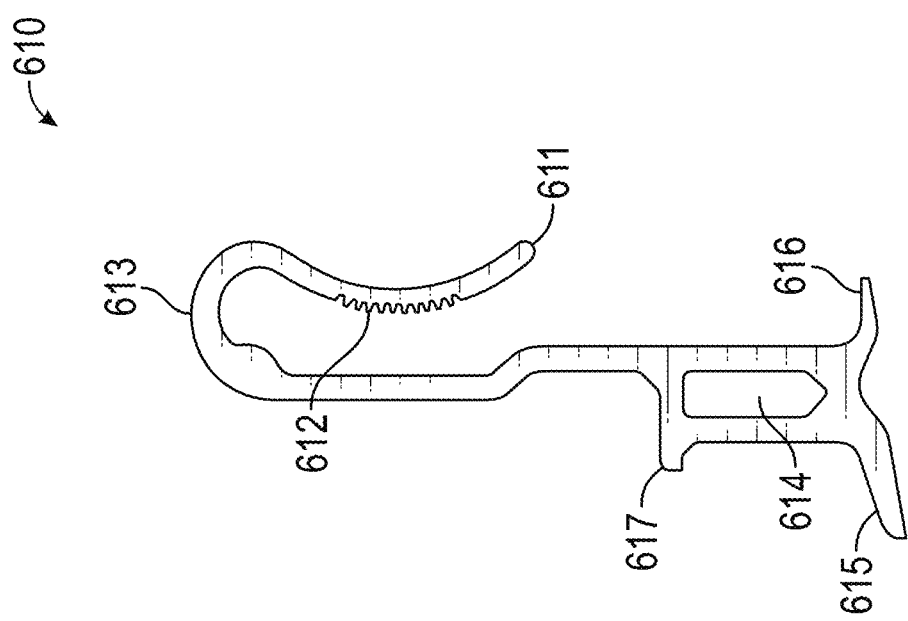

FIG. 6A illustrates a side cross-sectional view of an IEC 610 as can be employed in embodiments. This IEC 610 is labelled with arms 615 and 616, optional hollow 614, arm 617, and hook 613, having ridges 612, and tip 611. FIG. 6B illustrates a perspective view of the IEC 610. Labelled in FIG. 6B are arms 615 and 616, optional hollow 614, arm 617, and hook 613 having ridges 612, and tip 611. In embodiments, the IEC 610, like other connectors, can be extruded from a flexible polymer or other flexible material and can be configured to secure to PV panels and frames in order to hold them together during transport and be removed or repositioned after installation. The ridges 612 can provide for surface friction that can serve to hold the hook 613 in place around a PV flange of a PV frame section or other place of securement. The optional hollow 614, can serve to provide elastic deformation of the IEC during installation and removal. The optional hollow 614 can also serve to provide cushioning between secured frames or other protection during transport. FIG. 6B illustrates a perspective view of IEC 610.

Figure 7A:
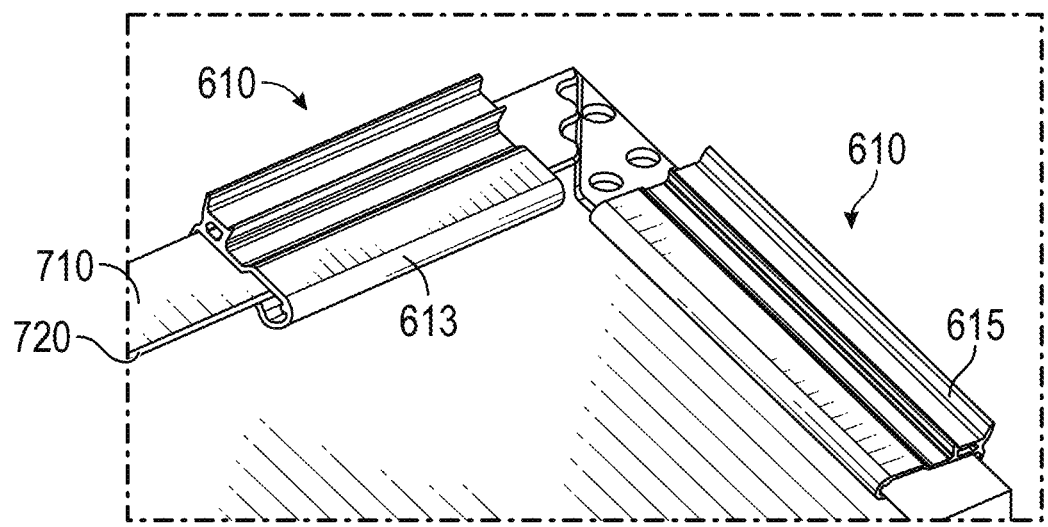
FIGS. 7A-7B illustrate perspective top and side views of IECs as can be employed, according to some embodiments.

FIG. 7A shows a bottom perspective view of IECs 610 secured to a PV frame edge 710 as can be employed in embodiments. Arm 615 and PV frame underside 720 are also labelled in FIG. 7A. Hook 613 is also shown; in an exemplary use, a hook 613 of the IEC 610 can be positioned around frame edge 710.

Figure 7B:
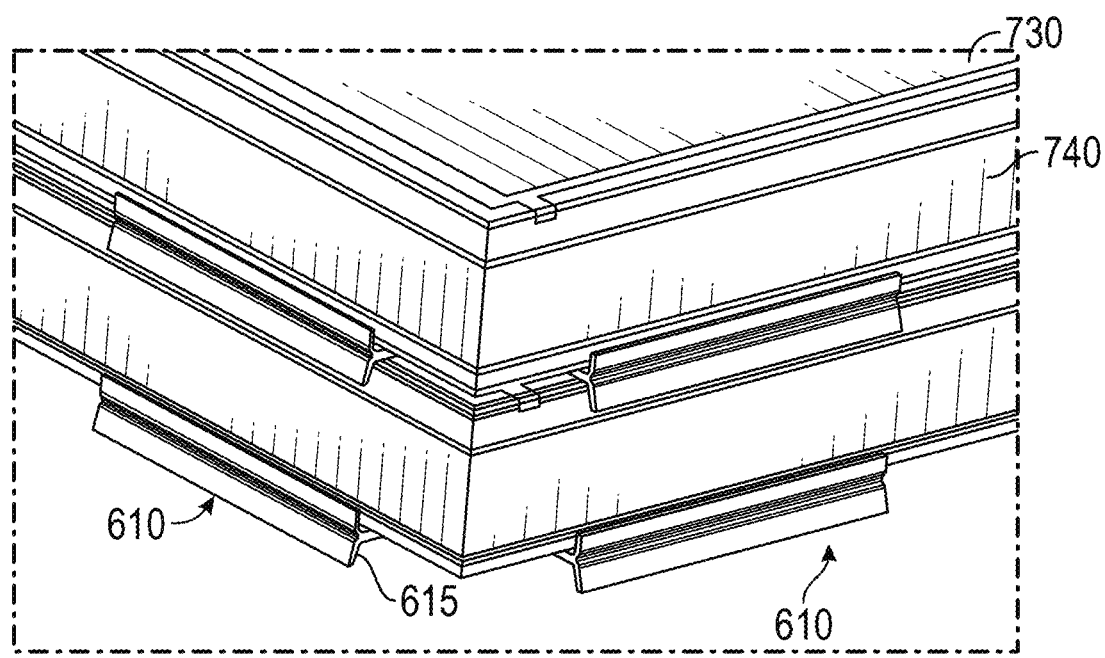

FIG. 7B illustrates two stacked PV panels with intervening and securing IECs as can be employed in embodiments. The stacked frames 740 and PV laminate surfaces 730 are labelled along with IECs 610 and IEC arm 615 in FIG. 7B. Although as shown, two PV panels can be stacked, alternatively a plurality of PV panels (e.g., more than two) can be stacked using IECs or other connectors.

As can be seen in FIG. 7A, when an IEC 610 is grasping a PV frame flange, another portion of an IEC can be exposed and ready to engage with a second PV frame. While the IECs are shown in FIG. 7B atop one another, the IECs can be staggered and not directly atop one another, in embodiments.

Figure 8A:
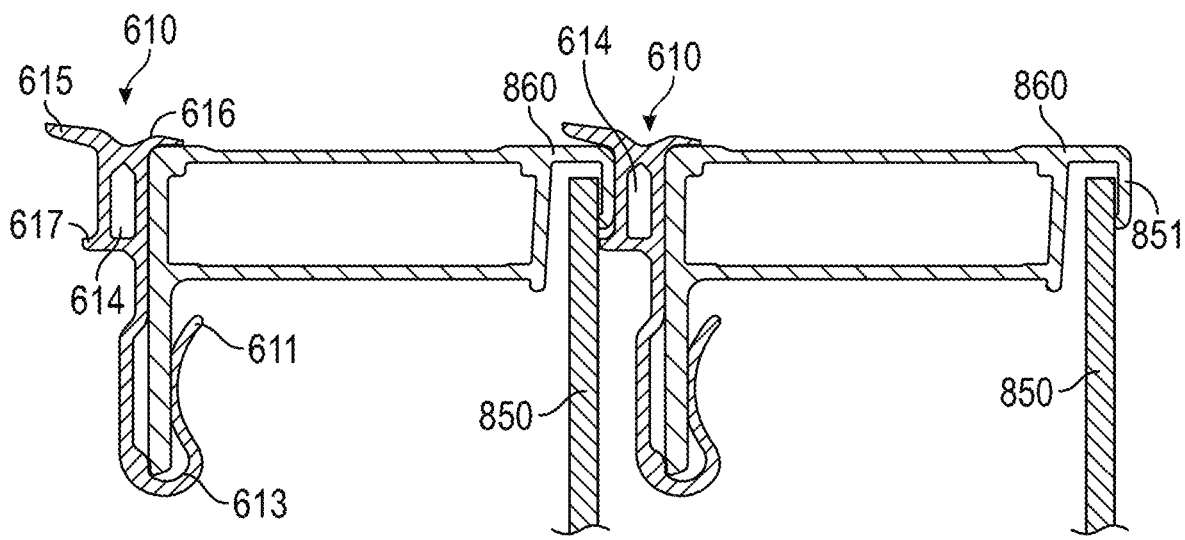
FIGS. 8A-8C illustrate side cross-sectional views of IECs engaging with PV frames and photovoltaic laminates as can be employed, according to some embodiments.
Figure 8B:
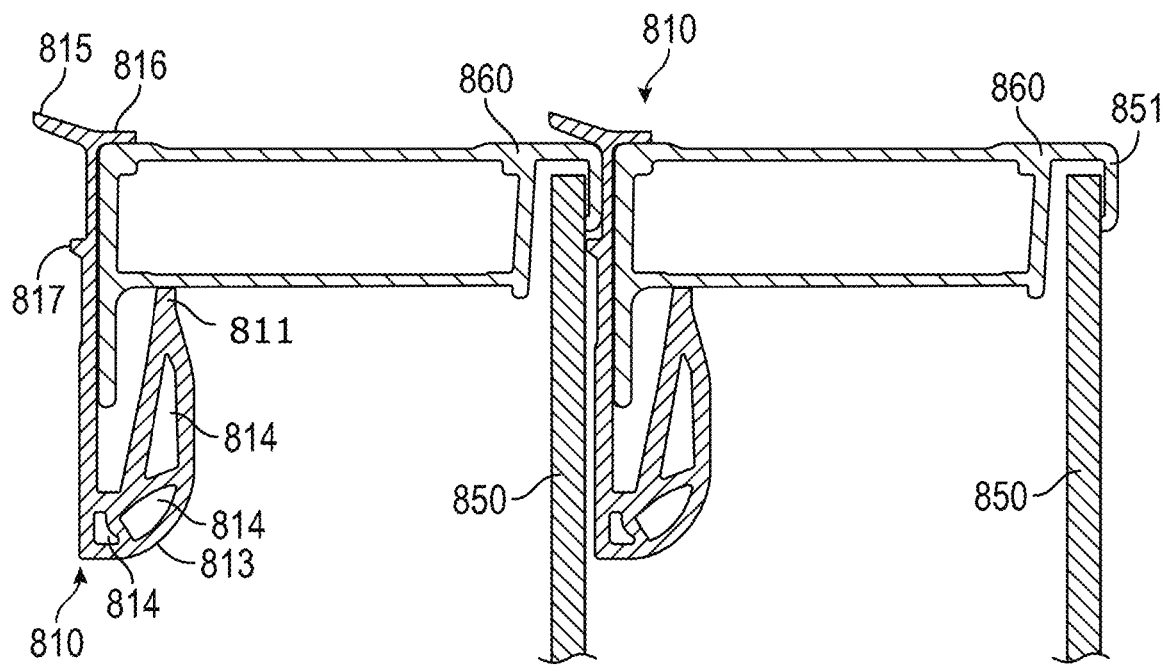
Figure 8C:
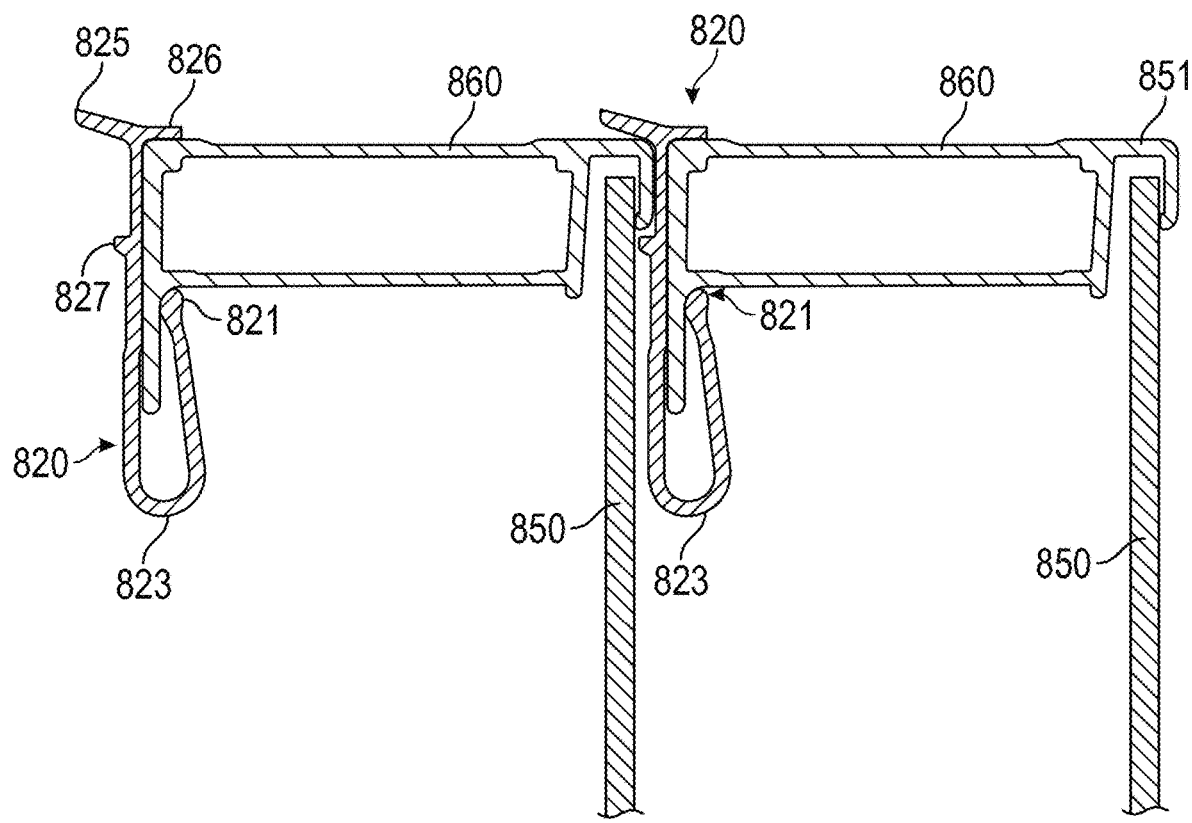

FIGS. 8A-8C shows side cross-sectional views of IECs engaged with PV frames as can be employed in embodiments. IECs 610, 810, and 820 are labelled along with PV frames 860, PV frame flanges 851, and PV laminates 850. In FIG. 8A, optional hollows 614, arms 617, tip 611, arms 615, 616, and hook 613 are labeled. In FIG. 8B, optional hollows 814, arms 817, tip 811, arms 815, 816, and hook 813 are labeled. In FIG. 8C, arms 827, tip 821, arms 825, 826, and hook 823 are labeled. As can be seen, and as described herein, connectors, such as IECs, can have various configurations and can serve to secure adjacent frames together. The frames can be oriented in horizontal, vertical, and other orientations. Tips of the IECs or other connectors can engage portions of a PV frame while other portions of the IEC can buffer against a PV laminate or a portion of another PV frame or both, as well as combinations thereof. Other portions of the IECs can engage the PV laminates and PV frames as well. As can be seen in FIG. 8, an IEC hook can have various configurations and multiple optional hollows. The multiple hollows, like the single hollow in some embodiments, can provide for elastic deformation during installation, removal, and use. Plastic deformation can be employed by IECs in some embodiments as well. For example, the tip 811, 821 can be compressed against the PV frame and can become plastically deformed so as to retain a compressive force against the PV frame in some embodiments.

FIG. 9 illustrates a cross-sectional view of IECs 820 positioned between and holding together roof panels 910, 911. These combined panels 910, 911 and IECs 820 can form a planar structure, such as can be positioned on the roof of a car-port or other light duty structure. In embodiments, the IECs or other connectors can be positioned such that rainwater can be channeled by them along seams of the roof structure or other planar surface. For example, the arms 825, 826 can sit above the surface of panels 910, 911 and channel rain water to remain on the surface of or run off the surface of panels 910 or 911. PV frame flanges 851, arms 827, hooks 823, and tips 821 are also labeled.

Figure 10A:
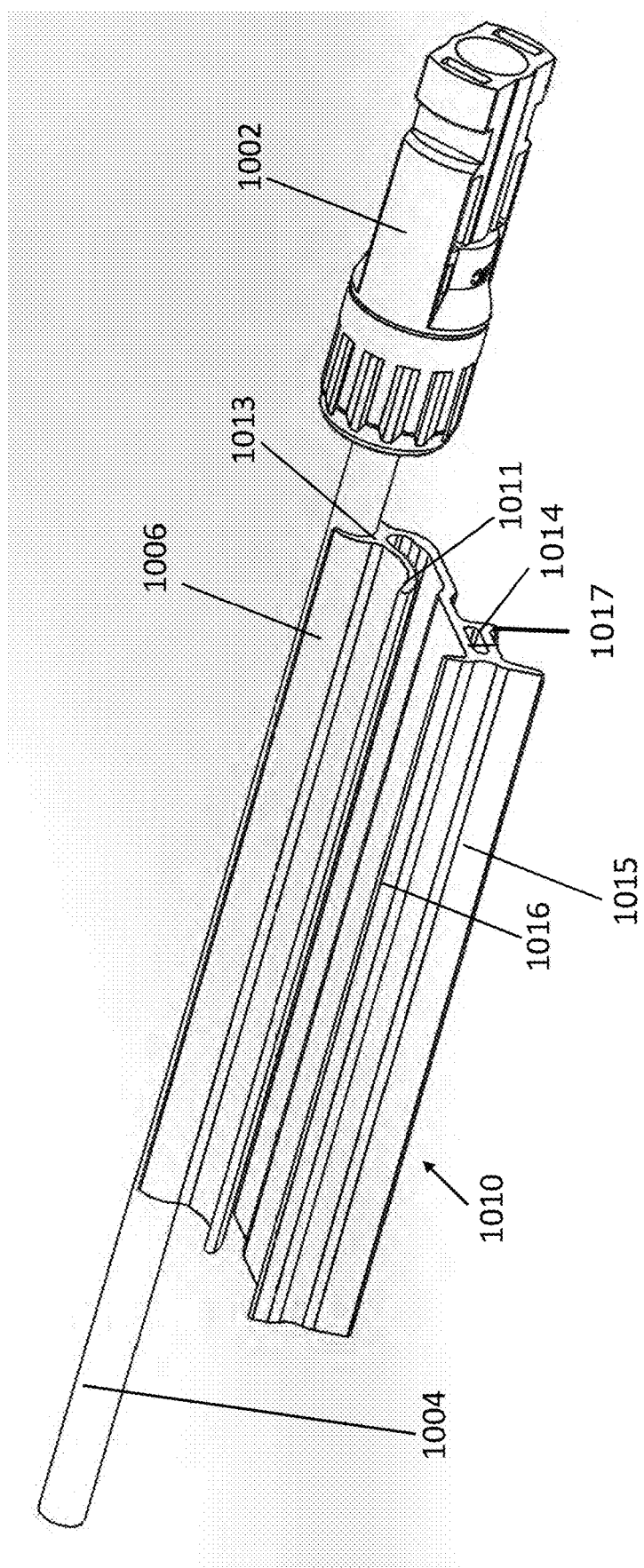
FIGS. 10A-10B illustrate a perspective view and a cross-sectional view of an IEC as may be employed, according to some embodiments.
Figure 10B:
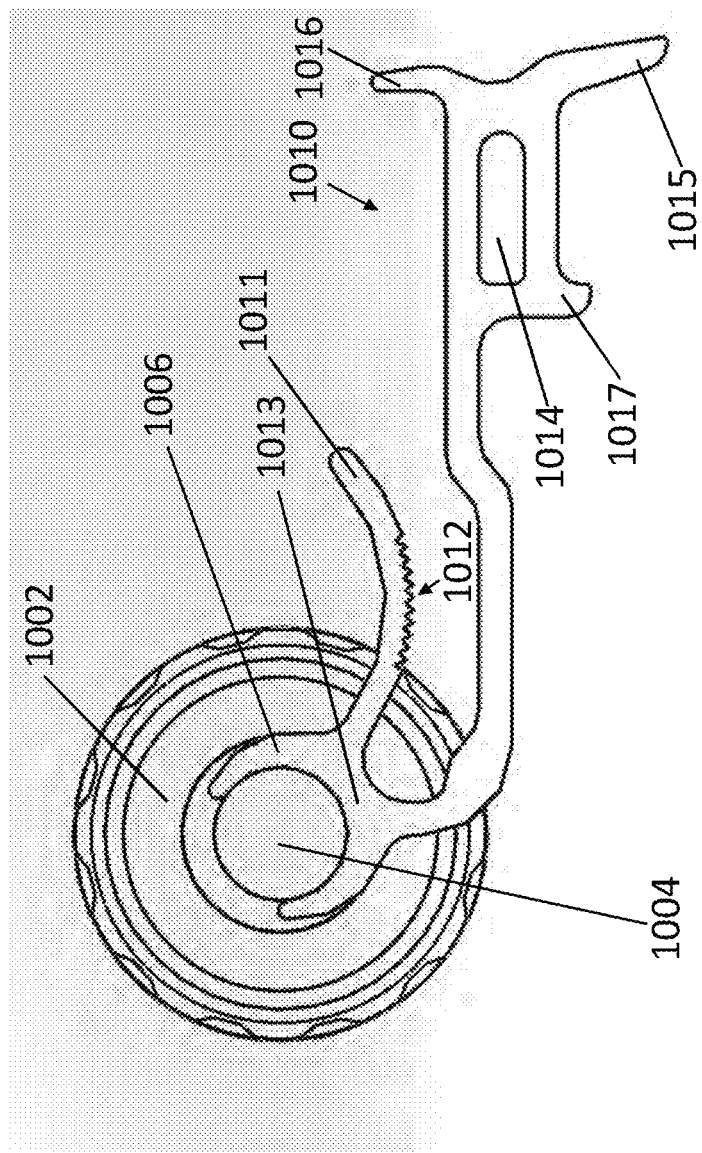

FIG. 10A illustrates perspective view of an IEC 1010 as may be employed in embodiments. This IEC 1010 can also be referred to as a cable manager connector. The IEC 1010 is labelled with arms 1015 and 1016, optional hollow 1014, arm 1017, and hook 1013, having ridges 1012 (e.g., as seen FIG. 10B), and tip 1011. In an embodiment, the IEC 1010 can include a clip feature 1006 for capturing, holding and/or securing an electrical conductor 1004 (e.g., photovoltaic electrical wire) and a corresponding electrical connector 1002 (e.g., a photovoltaic electrical connector). FIG. 10B illustrates a cross-sectional view of the IEC 1010. Labelled in FIG. 10B are arms 1015 and 1016, optional hollow 1014, arm 1017, and hook 1013 having ridges 1012, and tip 1011. In embodiments, the IEC 1010, like other connectors, may be extruded from a flexible polymer or other flexible material and may be configured to secure to PV panels and frames in order to hold them together during transport and be removed or repositioned after installation. The ridges 1012 can provide for surface friction that can serve to hold the hook 1013 in place around a PV flange of a PV frame section or other place of securement. The optional hollow 1014, may serve to provide elastic deformation of the IEC during installation and removal. The optional hollow 1014 may also serve to provide cushioning between secured frames or other protection during transport. As shown, in an embodiment, the IEC 1010 can include a clip feature 1006 for capturing, holding and/or securing an electrical conductor 1004. In particular, any features of this IEC 1010 can be employed and/or engaged with roof panels described herein, to support, handle and/or secure cabling (e.g., electrical cabling) for a roof panel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims can be formulated during prosecution of this application (or an application claiming priority thereto) to any such combination of features. In particular, with reference to the appended claims, features from dependent claims can be combined with those of the independent claims and features from respective independent claims can be combined in any appropriate manner and not merely in the specific combinations enumerated in the appended claims.

What is claimed is:

1. A connector system comprising:
a first photovoltaic module having a first frame rail;
a second photovoltaic module having a second frame rail; and
a first external connector, the first external connector comprising a first arm terminating in an anchor, a second arm connected to and extending away from the first arm, and a tail extending in a normal direction away from the first arm,
wherein the first external connector is coupled to the first photovoltaic module for transport of the first photovoltaic module with the second photovoltaic module and is coupled to the second photovoltaic module for transport of the second photovoltaic module with the first photovoltaic module,
wherein the first photovoltaic module is coupled to the second photovoltaic module in a stacked orientation,
wherein the first external connector restrains movement of the first photovoltaic module in at least one direction, and
wherein the first external connector restrains movement of the second photovoltaic module in at least one direction.

2. The connector system of claim 1 wherein the second arm terminates in a hook.

3. The connector system of claim 1 wherein the anchor comprises an external wall parallel to an external wall of the tail.

4. The connector system of claim 1 wherein the anchor and the tail define a space between them, the space surrounding a portion of the first frame rail.

5. The connector system of claim 1 wherein the tail terminates in a hook and comprises a plurality of compression bumps.

6. The connector system of claim 1, wherein the first external connector comprises an extruded material.

7. The connector system of claim 6, wherein the extruded material is a polymer.

8. The connector system of claim 1 wherein the wherein the first photovoltaic module is coupled to the second photovoltaic module in a vertical stacked orientation or a horizontal stacked orientation.

9. A frame and integrated external connector system comprising:
a plurality of integrated external connectors (IECs); and
at least two photovoltaic (PV) frames, each of the PV frames having an external rail on at least one side, the external rail having a cross-sectional shape with at least one perpendicular angle,
wherein the IECs comprise a first arm terminating in an anchor; a second arm; a hinge positioned between the first arm and the second arm; and a tail extending from the hinge, wherein the first arm, the second arm, and the tail comprise an extruded material.

10. The frame and integrated external connector system of claim 9 further comprising a plurality of straps encircling the at least two PV frames and wherein the second arm terminates in a flange.

11. The frame and integrated external connector system of claim 9 wherein the PV frames are each a polygon and are each connected to a PV panel having a plurality of PV cells.

12. The frame and integrated external connector system of claim 9 wherein the IECs are connected to the external rail of two PV frames and configured to slide when only connected to the rail of one PV frame.

13. An extruded connector comprising:
a pair of arms, a first arm of the pair extending in a first direction, a second arm of the pair extending in a second direction, the pair coupled to a body portion, the body portion including a third arm, the third arm extending from the body portion,
the first arm comprising a deformable section, the deformable section extending behind a first exposed surface of the first arm, the second arm terminating in a hook the hook comprising one or more hollows,
wherein the hook, pair of arms, body portion, and third arm comprise an extruded material.

14. The connector of claim 13 wherein the hook, pair of arms, body portion, and third arm comprise a flexible polymer.

15. The connector of claim 13 wherein the hook comprises a bulbous end.

16. The connector of claim 13 wherein the body portion comprises an elongated planar section connecting the pair of arms and the hook.

17. The connector of claim 13 wherein the pair of arms form a flange coupled to the body portion.

18. A connector system comprising:
a first photovoltaic module having a first frame rail;
a second photovoltaic module having a second frame rail; and
a first external connector, the first external connector comprising a first arm terminating in an anchor, a second arm connected to and extending away from the first arm, and a tail extending in a normal direction away from the first arm,
wherein the first external connector is coupled to the first photovoltaic module and is coupled to the second photovoltaic module,
wherein the first external connector restrains movement of the first photovoltaic module in opposing lateral directions,
wherein the first external connector restrains movement of the second photovoltaic module in at least one direction, and
wherein the anchor comprises a hollow.

19. A connector system comprising:
a first photovoltaic module having a first frame rail;
a second photovoltaic module having a second frame rail; and
a first external connector, the first external connector comprising a first arm terminating in an anchor, a second arm connected to and extending away from the first arm, and a tail extending in a normal direction away from the first arm,
wherein the first external connector is coupled to the first photovoltaic module and is coupled to the second photovoltaic module, wherein the first external connector restrains movement of the first photovoltaic module in opposing lateral directions, wherein the first external connector restrains movement of the second photovoltaic module in at least one direction, and wherein the first arm and the second arm are connected at a hinge.

20. A polymeric PV module transport connector comprising:

a pair of arms, a first arm of the pair extending in a first direction, a second arm of the pair extending in a second direction, the pair coupled to a body portion, the body portion including a third arm, the third arm extending from the body portion, the first arm comprising a deformable section, the deformable section extending behind a first exposed surface of the first arm, the second arm terminating in a hook, wherein the hook, pair of arms, body portion, and third arm comprise a polymeric material, wherein the first arm is configured to couple with a portion of a first photovoltaic module and the second arm is configured to couple with a portion of a second photovoltaic module when the first photovoltaic module and the second photovoltaic module are positioned in a stacked orientation for transportation.

21. The polymeric PV module transport connector of claim 20 wherein the polymeric material comprises a rigid polymer.

* * * * *